United States Patent
Boehler et al.

[19]

[11] Patent Number: 5,858,487
[45] Date of Patent: Jan. 12, 1999

[54] NON-STICK MICROWAVEABLE FOOD WRAP

[75] Inventors: William L. Boehler, Claridge House II, Apt. 5L, Verona, N.J. 07044; Joseph J. Funicelli, 213 E. 19th St., Paterson, N.J. 07524

[73] Assignees: Joseph J. Funicelli, Paterson; William L. Boehler, Verona, both of N.J.

[21] Appl. No.: 629,774

[22] Filed: Apr. 9, 1996

Related U.S. Application Data

[63] Continuation-in-part of Ser. No. 395,088, Feb. 27, 1995, abandoned.

[51] Int. Cl.⁶ ............ B32B 15/08; B32B 15/12; B32B 27/10; B32B 27/36
[52] U.S. Cl. ............ 428/34.3; 428/34.2; 428/35.8; 428/35.9; 428/40.2; 428/40.9; 428/41.8; 428/219; 428/340; 428/341; 428/342; 428/402.2; 428/402.24; 428/458; 428/461; 428/462; 428/481; 428/483; 428/511; 428/905; 219/725; 219/727; 219/730
[58] Field of Search ............ 428/34.2, 34.3, 428/35.2, 35.3, 35.7, 35.8, 35.9, 213, 214, 215, 216, 219, 334, 335, 336, 337, 339, 457, 458, 461, 462, 480, 481, 511, 521, 537.5, 402, 402.2, 402.21, 402.24; 219/725, 727, 728, 730

[56] References Cited

U.S. PATENT DOCUMENTS

| | | | |
|---|---|---|---|
| 4,230,924 | 10/1980 | Brastad et al. | 219/10.55 E |
| 4,267,420 | 5/1981 | Brastad | 219/10.55 E |
| 4,276,312 | 6/1981 | Merritt | 426/96 |
| 4,405,663 | 9/1983 | Archibald et al. | 428/34.3 |
| 4,487,657 | 12/1984 | Gomez | 162/158 |
| 4,596,713 | 6/1986 | Burdette | 426/107 |
| 4,641,005 | 2/1987 | Seiferth | 219/10.55 E |
| 4,825,025 | 4/1989 | Seiferth | 219/10.55 E |
| 4,962,000 | 10/1990 | Emslander et al. | 428/461 |
| 5,177,332 | 1/1993 | Fong | 219/10.55 E |
| 5,203,491 | 4/1993 | Marx et al. | 229/2.5 R |
| 5,231,268 | 7/1993 | Hall | 219/10.55 E |
| 5,294,765 | 3/1994 | Archibald et al. | 219/727 |
| 5,313,002 | 5/1994 | De Heij et al. | 568/664 |

*Primary Examiner*—Vivian Chen
*Attorney, Agent, or Firm*—Frank Cozzarelli, Jr.; Cozzarelli & Mautone Attorneys-at-Law

[57] ABSTRACT

According to the present invention a non-stick, microwaveable food wrap for crispening and browning of food is provided comprising a non-stick layer; a polymeric film layer; an unperforated susceptor layer; an adhesive layer; a paper layer and optionally containing at least one encapsulated flavor and/or fragrance incorporated into the laminated non-stick microwaveable food wrap and freshly released by microwave heating into the food item while being cooked, browned and crispened.

3 Claims, 1 Drawing Sheet

NON-STICK MICROWAVEABLE FOOD WRAP

This applicatio is a continuous-in-part of application Ser. No. 08/395,088, filed Feb. 27, 1995, abandoned.

TECHNICAL FIELD

This invention relates generally to food wrap for use in a microwave oven, and, more particularly, is directed to a laminated, non-stick, microwaveable food wrap that may be formed by the user into a package to enclose food items to be cooked, browned and crispened therein. Encapsulated flavors and fragrances, if optionally incorporated into the laminated, non-stick, microwaveable food wrap, can be freshly released by microwave heating, on and into the food being cooked, browned and crispened.

BACKGROUND OF INVENTION

The use of microwave ovens for quickly and conveniently heating and cooking foods has become commonplace and continues to grow. The increased use of frozen microwaveable food propels that growth even further because of the lack of desire or time to spend in cooking food. The speed in the preparation and serving of complex frozen dishes; the ability to microwave ready-to-eat food; and the steady improvement in the quality and diversity of fast food, not only in the home, but also within the great fast food outlets, has led to considerable effort being expended to upgrade food compositions and products to make them more suitable for shipping, handling, packaging and cooking.

However, microwave cooking is known to be unsatisfactory for a variety of foods, especially those that require browning or crispening by surface heating. A number of methods and containers have been used; however, a variety of problems have not been adequately addressed such as the food adhering to the film or container, the need to flavor or add fragrance to the food, or the need to easily form a cooking package with food wrap.

There have been considerable improvements in microwave cooking and packaging technology in the past two decades. Microwave cooking is fast, efficient and economical in contrast to infra-red cooking; however, microwave cooking has several disadvantages. Primarily, it cannot crisp, brown and optionally add flavors or fragrances to food such as chicken, doughy products, frankfurters, hamburgers, steaks, pizza, etc. It is known that the fundamental reason for this is that microwaves cook food from the inside out whereas infra-red cooks from the outside in.

Various attempts have been made to correct for the inherent lack of browning and crispening such as physical modifications to the microwave oven, the addition of edible coatings to the food, and the use of a variety of preformed cooking packages, dishes and the like.

It is known that a thin metal film, such as, but not limited to, aluminum, can absorb substantial amounts of microwave energy and convert this energy into thermal energy for heating a variety of food products. These thin metal films, commonly called susceptors, are associated with conductive and infra-red heat transfer to the food product. The food still tends to stick to these containers.

Some of the prior art patents pertaining to microwave cooking include the following patents:

U.S. Pat. No. 5,231,268 discloses a four layered paperboard, semirigid packing material for use in manufacturing containers. In this instance, a paperboard substrate was coated with a thermal insulator, e.g., sodium silicate, followed by a printable, aqueous susceptor-ink layer (graphite in a sodium silicate vehicle), and a thermal barrier layer to facilitate release of water vapor from the layers. Neither the use of a non-stick coating, nor flavoring and/or fragrance nor an aluminum coating were utilized. The package was also preformed.

U.S. Pat. No. 4,267,420 pertains to a four layered, preformed structure comprising a polymer film with vacuum deposited aluminum susceptor, an adhesive layer and a second polymer layer preferably polyethylene. There was no non-stick layer and two polymeric film layers are used.

In the present invention one polyester film layer and one susceptor layer on paper film in addition to an adhesive layer (preferably FDA approved) and a non-stick layer (preferably FDA (approved) that can be optionally modified to add flavor and fragrance are used because this combination imparts the desired dimensional stability, the non-stick properties, the browning and crispening. Moreover, the present invention allows the package to be easily custom formed by the user. Prior art U.S. Pat. No. 5,231,268 utilizes various layers to release water vapor produced during the cooking. This does not prevent food from sticking to the container, but does include a susceptor layer and thermal insulators such as sodium silicate.

Prior art U.S. patents in the general area of which we are aware include: U.S. Pat. Nos. 4,641,005 and 4,825,025.

Accordingly, it may be appreciated that the prior art relates to preformed, rigid paperboard containers, manufactured at a factory, filled with food at another factory, transported to a retailer, stored in the package and finally purchased as a package ready for use in a microwave oven for cooking.

DISCLOSURE OF THE INVENTION

An object of the present invention, therefore, is to provide a non-stick, laminated food wrap that combines the use of microwave and infra-red cooking.

Another object of the present invention is to provide an economical as well as a convenient method for microwave crispening and browning of food in which neither a receptacle nor container manufactured at a factory is used.

Another object of the present invention is to provide a non-stick, laminated film that is formed into a roll ready for use by the consumer.

Another object of the present invention is to provide the non-stick, laminated film that is formed into a roll so the user may form a variety of shapes or packages for the food item to be cooked.

Still another object of the present invention is the incorporation of a layer of encapsulated flavors and/or fragrances which are released by heating of the susceptor layer which causes the flavor and/or fragrance to be released thereby imparting preferred flavors and/or fragrances to the crispened and browned food.

Accordingly the present invention pertains to a laminated, microwaveable cooking food wrap comprising: a non-stick layer; a heat releasable optional layer of at least one food flavoring and optionally at least one fragrance; a polymeric film layer; an unperforated single susceptor layer preferably but not limited to aluminum; an adhesive layer; and a paper layer all of which form a non-stick microwaveable food wrap that can be easily formed into a custom-made cooking package suitable for use in a microwave oven.

The flavors and fragrance coating (F & F coating) if used, is incorporated into the non-stick coating, i.e. both combined during production as a single coating. Or, if so desired, two or more separate coatings can be applied (not shown in FIG. 1). First, at least one coating of encapsulated flavor is deposited, then at least one coating of a fragrance is deposited and finally a non-stick coating. The final layer in contact with the food is the non-stick coating. Both the F & F coatings and the non-stick layer are preferably FDA approved.

The adhesive layer used to bond the unperforated susceptor layer to the surface of the paper is FDA approved. The resulting laminate is made in roll form for household or other use wherein the user tears off a sufficient quantity of food wrap to enclose the food item to be cooked, browned, crispened and flavored or fragrance added if desired.

DESCRIPTION OF THE PREFERRED EMBODIMENT(S)

Figure 1:
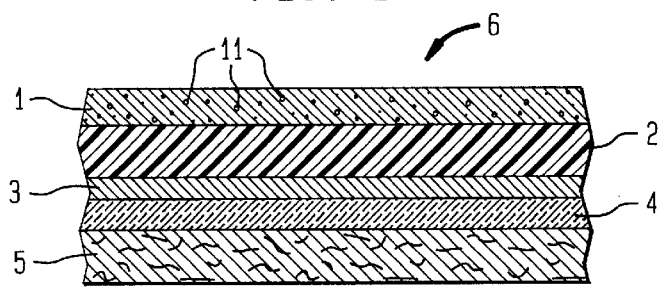
FIG. 1 illustrates in cross section a typical laminate for the non-stick, microwaveable food wrap with encapsulated particles of flavor or fragrance according to the present invention.
Figure 2:
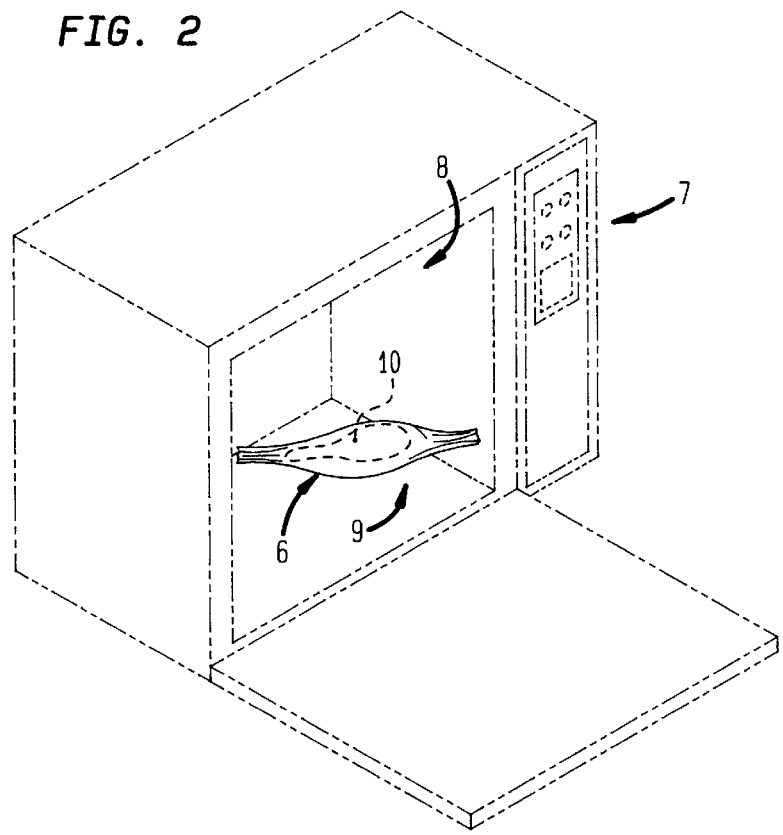
FIG. 2 is a perspective view of said laminate food wrap formed into a cooking package by wrapping said food wrap around an item of food to be cooked in a microwave oven.
Figure 3:
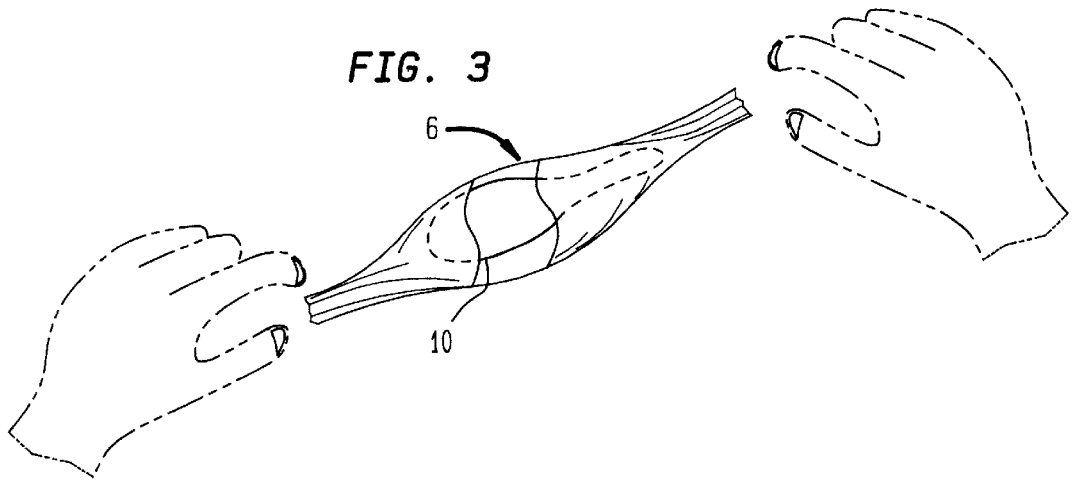
FIG. 3 is a perspective view of the food item to be cooked, wrapped in the food wrap of the present invention and ready to be placed in a microwave oven.

Referring to the drawings, wherein like reference numbers represent identical or corresponding parts throughout the several views, and more particularly to FIGS. 1, 2 and 3 thereof, is shown a preferred embodiment of the present invention which is utilized in microwave cooking, flavoring, fragrancing, browning and crispening of food. The wrap of the present invention, as shown in FIG. 1, has no perforations.

Layer 1 in FIG. 1, is a thin non-stick coating (optionally containing flavors, fragrances, and mixtures thereof) that is applied by a number of methods well known in the art such as, but not limited to, roller coating, curtain coating, doctor blading, gravure coating, rod coating, etc. In the examples cited herein, gravure coating was used. An example of a non-stick coating for use in preventing food from adhering to polymeric film layer 2 is one made from a chrome complex of stearic acid ((chromium, pentahydroxy, (tetradecanoato) di-)), and is commercially available from the DuPont Company as QUILON C complex. The resulting laminate of the present invention is non-explosive and nonflammable. QUILON C complex has the approval of the FOOD and Drug Administration (FDA) and the Meat and Poultry Inspection Program of the United States Department of Agriculture (USDA). The use of QUILON C in the manufacture of paper and paperboard products for use in contact with aqueous or fatty foods has prior sanction and is covered in FDA Regulation 21 CFR 181.22 and 182.30 and the use with dry foods is covered in FDA Regulation 21 CFR 176.180

Encapsulated particles 11 in FIG. 1 containing flavors, fragrances, and mixtures thereof may be incorporated within the non-stick layer 1 and are those preferably approved by the Food and Drug Administration (FDA). However, some flavors are natural products and FDA approval is not required.

Encapsulation is a process in which droplets of liquids or tiny particles are surrounded by a coating to provide small capsules or microcapsules. The material inside the microcapsules is known as the core, internal phase or fill, whereas the wall is referred to as the shell, coating or membrane.

The purpose of the encapsulation is to isolate the core or flavor and/or fragrance of the capsule from its surroundings until it is desirable to release them into the food being cooked, browned and crispened. In the present invention, this occurs when the capsule wall melts due to the heat provided by the microwave oven.

Examples of shell or encapsulating materials are, but are not limited to, natural or synthetic organic polymers such as gelatin, gum arabic, carrageenan, selected fats or waxes, etc. A multitude of core materials or flavors and/or fragrances exist. Some examples of flavors used, but not limited to, are mint, garlic, fresh herbs (e.g., basil, bay leaves, borage, etc.) barbecue sauce, sugar, lemon, soy sauce, vanilla, almond and cinnamon. Various natural flavors, such as, onion, garlic, and others do not need FDA approval. Some examples of fragrances that may be used are, but are not limited to, fresh bread, orange, rose, lavender and roasting meat. The importance between the odor and perceived taste is well known and plays an important role in the judgment of quality of food. This is best illustrated in many ethnic cuisines where particular flavors and fragrances are highly desired.

Many well known encapsulation techniques and variations thereof are available, depending on such factors as wall permeability, surface free energies, physical properties, etc. In the present invention, since organic liquids make up most of the cores, coacervation techniques, interfacial polymerization and liquid-jet methods are applicable.

The microcapsules can be dispersed into the non-stick coating and applied to the unperforated susceptor layer, preferably aluminum, of the food wrap by gravure coat, air knife or silk screen operations. The microcapsules can be purchased from Hercules Company and Webcraft Technologies.

Layer 2 in FIG. 1 is a polymeric film, which can be polyethylene, polyester or other resins but is preferably a polyester. The layer preferably ranges in thickness from about 0.0003 to about 0.00075 inch. Layer 2 serves not only to provide mechanical strength but also a very smooth surface allowing for a controlled application of the susceptor coating described in layer 3. Layer 2 also serves as a membrane resistant to oils and water vapor. Layer 2 also prevents charring of paper layer 5 at high cooking temperatures.

Layer 3 in FIG. 1 is a susceptor layer that can be tin, zinc, iron, gold, silver, copper, and other metals, but is preferably aluminum. It is unperforated. Microwave susceptors are materials that absorb microwave energy, convert the absorbed energy into thermal energy (heat) and thereby heat the food item surrounded by it. Said layer 3 is preferably a thin, aluminum coating deposited onto polymeric layer 2 and has a resistivity of greater than about 25 but less than about 75 ohms per square, and an optical density ranging from about 0.15 to about 0.40.

Optical density is the common logarithm of the opacity of a material, and opacity is the reciprocal of the transparency. Transparence of the layer of material is defined as the ratio of the intensity of the transmitted light to that of the incident light. Thus, $$\text{Transparency} = I_{t/i}$$

$$\text{Opacity} = 1/\text{transparency} = I_{i/t}$$

$$\text{Optical density} = \log_{10}(I_{i/t})$$

where $I_i$=Intensity of incident light $I_t$=Intensity of transmitted light.

Layer 3, which is preferably a continuous layer of aluminum, acts as the susceptor for crispening and browning of various foods, for example but not limited to, biscuits, doughy food, fish sticks or fillets, frankfurters, french fried potatoes, chicken, etc.

The heat generated within susceptor layer 3 also ruptures the capsules containing flavors and fragrances thereby enabling them to flavor and/or add a fragrance to the food.

Microwave energy of about 2.45 gigahertz when incident upon a very thin metal film is not totally reflected. Rather a large portion is converted into infra-red (IR) heat which in turn is transmitted to the surface of the food product that is being made brown and/or crisp. It is well known that microwaves cook from the inside of the food to the outside, whereas infra-red heat cooks from the outside and penetrates inwardly. The combination of the two heating methods is preferred for cooking convenience. Thus, when coupled with a non-stick material, such as layer 1, and a susceptor layer, such as layer 3, for crispening and browning of the food surface, the combination greatly enhances the cooking, taste and appearance of the final product.

Layer 4 in FIG. 1 is preferably an FDA approved adhesive material used to bond the aluminum layer 3 to said paper layer 5. The FDA approved adhesive layer 4, for example, is preferably a polymer emulsion of styrene/butadiene copolymer, available from the ElectroMek Corporation of Carlstadt, N.J. Said adhesive at normal microwaveable temperatures does not give off any obnoxious by-products or odoriferous gases that could taint the food by migration. In the examples cited below a reverse roll coating was applied at 0.75 to 1.5 pounds of adhesive per 3000 square feet of paper. The use of said adhesive in the manufacture of paper and paperboard products for use in contact with aqueous or fatty foods has prior sanction and is covered in FDA Regulation 21 CFR 181.22 and 182.30 and the use with dry foods is covered in FDA Regulation 21 CFR 176.180

Layer 5 in FIG. 1 is a flexible paper readily commercially available having a weight of approximately 30 pounds per 3,000 square feet, and is approximately 0.002 to 0.004 inch thick. Said paper serves several functions. Layer 5 adds mechanical strength and dimensional stability to the polymeric layer 2. At high temperatures, polymeric layer 2 tends to distort, warp, craze, or shrink, etc. In the present invention this is greatly diminished by the bond of the polymeric layer 2 with the paper layer 5. Layer 5 also functions as an infra-red heat barrier directing inwardly some of the infra-red heat generated in susceptor layer 3. Arcing between the unperforated susceptor layer 3 and the wall of the microwave oven is prevented by the paper layer 5.

Item 6 in FIGS. 1, 2 and 3 designates an embodiment of the entire laminated non-stick microwaveable food wrap.

In FIG. 2 an item of food, a chicken leg 10, wrapped in the non-stick microwaveable food wrap of the present invention 6 is shown placed in the lower tray 9 of the heating portion 8 of the microwave oven 7 ready for cooking, browning, crispening, and optionally adding flavoring, a fragrance or mixtures thereof.

In FIG. 3 the non-stick microwaveable food wrap of embodiment 6 is shown formed around an item of food, said chicken leg 10, and is ready for cooking, browning and crispening and optionally flavoring. The non-stick microwaveable food wrap of the embodiment 6 has been wrapped by the end user around the chicken 10 and the ends of the wrap have been twisted to enclose the food item. This allows the consumer to custom wrap the food item to the desired shape or package preferred for microwave cooking.

In all examples cited herein, the samples were wrapped in the non-stick, microwaveable laminated food wrap of the present invention comprising a first layer of gravure coated complex of stearic acid having an approximate weight of about 0.05 to 0.5 pound per 3000 square feet, a polyester film (second layer) having a thickness of approximately 0.0005 inch, a third layer of an unperforated aluminum coating having an approximate resistivity greater than about 25 and less than about 75 ohms per square and an optical density of greater than about 0.15 and less than about 0.40, a fourth layer of an FDA approved emulsion adhesive having a weight of approximately 0.75 to about 1.5 pounds per 3000 square feet and a fifth layer of a thirty pound basis weight paper (per 3000 square feet). Flavors and fragrances were excluded.

The non-stick microwaveable food wrap of the present invention was tested by cooking diverse foods in a microwave oven such as; meats, poultry, puff pastry, breads, fish, potatoes, eggs etc. and are described in the following examples.

1. A fresh egg, with the shell removed, was placed on the wrap of the present invention with the non-stick layer 1 in contact with the egg and then placed on a rack in a 700 watt microwave oven and cooked for three minutes. A second egg was cooked for five minutes. Excellent release of both cooked eggs was achieved. Generally, the albumen of an egg will stick tenaciously to most substrates, but did not stick to the wrap of the present invention. There was no arcing to the susceptor layer.

2. An uncooked frankfurter was wrapped in raw dough and then wrapped in the wrap of the present invention, in a tube-like fashion with the sides of the wrap along the length of the frankfurter overlapped but with the ends left open. This was placed in a 700 watt microwave oven for three (3) minutes. The frankfurter was cooked, the dough was crisp and brown with excellent release from the wrap and ready for consumption.

3. Thinly sliced potatoes were placed between two sheets of the wrap of the present invention while keeping the non-stick side of the wrap of both pieces in contact with the potatoes. The resulting sandwich-like package was then placed on an elevation rack in a 700 watt microwave oven. To maintain close physical contact with the non-stick layer of the wrap, a nonconductive flat, ceramic plate was placed on top of the sandwich-like package. The potatoes were cooked for five minutes in the microwave oven. This resulted in crisp, brown and nongreasy chips. Frozen potatoes were cooked in the same manner and also resulted in similar chips. They did not stick to the wrap.

4. A slice of cold pizza, if reheated in a microwave oven, becomes soggy and chewy. However, when a slice of cold pizza was placed on a piece of the wrap of the present invention, with the non-stick layer in contact with the pizza, and heated in a 700 watt microwave oven for one minute the pizza became crisp and had a brown texture as if it were freshly baked and did not stick to the wrap.

5. A slice of uncooked, frozen pizza, was placed on the wrap of the present invention and cooked for three minutes on an elevation rack in a 700 watt microwave oven. After cooking, the pizza slice was crisp and brown and had the appearance of having been freshly baked in a conventional pizza oven and did not stick to the wrap.

6. Three pork chops, each approximately one inch thick, were cooked in a 700 watt microwave oven for fifteen minutes and resulted in three moist and browned pork chops that did not stick to the wrap. To prepare the pork chops for cooking, a paper towel was placed in a nonconductive plate to absorb the juices generated during microwaving. The three pork chops were placed on a sheet of the wrap of the present invention so that the upper wrap touched the pork chops. The portion of the wrap on the bottom of the pork chops was perforated with a fork to provide drain holes so that the juices could drip through onto the paper towel. The upper susceptor layer was not perforated. However, the perforations were through the bottom portion of the wrap of the present invention and are not required, but are merely to facilitate removal of the drippings. A second sheet of the wrap was placed on top of the pork chops with the susceptor layer touching the pork chops. A flat, nonconductive, ceramic plate was placed on the outer surface of the top piece of wrap so the susceptor layer was in physical contact with the chops. The nonconductive plate containing the pork chops surrounded with the wrap, was then placed in the microwave oven for cooking.

7. Hamburgers made from raw meat were prepared as in Example 6 and then cooked in a 700 watt microwave oven for ten minutes. This yielded brown, juicy and crisp hamburgers that did not adhere to the wrap.

8. A whole Cornish hen, which weighed approximately two pounds, was wrapped in the wrap of the present invention so the susceptor layer touched the hen and the wrap overlapped by one inch along the top breast portion of the hen. The ends of the wrap were loosely twisted. The wrap at the bottom of the hen was perforated with a fork merely to provide drain holes so the juices released during cooking could drip through and be absorbed onto a sheet of paper towel. The upper susceptor layer was not perforated, however. The hen with the wrap and the paper towel was placed on a nonconductive, ceramic plate ready for microwave cooking. The hen thus prepared was placed in a 700 watt microwave oven and cooked for fifteen minutes and yielded a juicy, browned and crispy Cornish hen that did not stick to the wrap.

9. Raw chicken parts were wrapped, as in example eight, and were cooked in a 700 watt microwave oven for seven minutes. This yielded juicy, browned and crispy chicken parts that did not stick to the wrap.

10. Canned, refrigerated raw dough biscuits such as are commercially available in supermarkets and other stores from Pillsbury Dough Pop and Fresh were placed in a tube of the wrap of the present invention with the susceptor layer touching said dough and with the ends twisted closed. The wrapped biscuits thus prepared were placed on an elevated rack in a 700 watt microwave oven and baked for one minute yielding crisp, brown biscuits appearing as if they were baked in a conventional oven. The biscuits did not stick to the wrap.

In all of the examples described a flavor or fragrance could have been added, if desired, had the wrap of the present invention been made with one or more flavor or fragrance or combinations thereof.

The non-stick, microwaveable food wrap 6 embodiment of the present invention is preferably, but not limited to, being packaged in the form of a roll, placed in a paperboard box for dispensing similar to other commercially available household packaging wraps. Rolls of various lengths and widths of the wrap as well as sheets can also be produced.

A number of additional advantages relating to the non-stick, microwaveable food wrap of the present invention follow:

An advantage of the present invention is that an inexpensive non-stick, microwaveable food wrap is provided that is used for cooking, browning, crispening food wrapped therein.

Another advantage of the present invention is that the non-stick layer may also optionally include various flavors, fragrances, and mixtures thereof commonly used with food.

Another advantage of the food wrap of the present invention is that it is flexible and the consumer can easily form a custom made package around the item to be cooked.

Another advantage of the food wrap of the present invention is that it can be used for microwaving, crispening and browning of frozen food, refrigerated cold food and food at room temperature.

A non-stick microwaveable food wrap for crisping and browning of food comprises a nonstick layer comprising a chrome complex of stearic acid; a polymeric film is intended, that this description be taken as illustrative only and not be construed in any limiting sense.

We claim:

1. A laminated, microwaveable food wrap comprising:
   (i) a non-stick layer comprising a chrome complex of stearic acid, said layer having a weight greater than about 0.05 pound and less than about 0.5 pound per 3000 square feet;
   (ii) a polyester film layer having a thickness of about 0.0003 inch to about 0.00075 inch;
   (iii) an unperforated, single aluminum susceptor layer having a resistivity of greater than about 25 ohms and less than about 75 ohms per square and an optical density of about 0.15 to about 0.40;
   (iv) a polymer emulsion adhesive layer having a weight of about 0.75 to about 1.5 pounds per 3000 square feet;
   (v) a paper layer wherein the thickness of the layer is greater than about 0.002 inch and less than about 0.004 inch and the layer has a weight of about 30 pounds per 3000 square feet; and
   (vi) optionally, at least one food flavoring or fragrance.

2. The laminated wrap of claim 1 wherein the adhesive layer is a copolymer of styrene and butadiene.

3. The laminated wrap of claim 1 wherein the wrap contains at least one food flavoring or fragrance, and said flavoring or fragrance is in the form of encapsulated particles present in the non-stick layer, wherein said encapsulated particles are optionally thermally activated.

* * * * *

UNITED STATES PATENT AND TRADEMARK OFFICE
CERTIFICATE OF CORRECTION

PATENT NO. : 5,858,487
DATED : Jan. 12, 1999
INVENTOR(S) : Boehler et al.

It is certified that error appears in the above-identified patent and that said Letters Patent is hereby corrected as shown below:

On the title page,
Under Item [73] Assignees: should read
-- Unifoil Corporation, Passaic, NJ --

Signed and Sealed this

Twenty-fifth Day of May, 1999

Attest:

Q. TODD DICKINSON

Attesting Officer

Acting Commissioner of Patents and Trademarks